Sept. 11, 1923. 1,467,417
A. C. BECKWITH
AUTOMATIC FLUID PRESSURE CONTROLLING DEVICE
Filed June 13, 1918  2 Sheets-Sheet 2
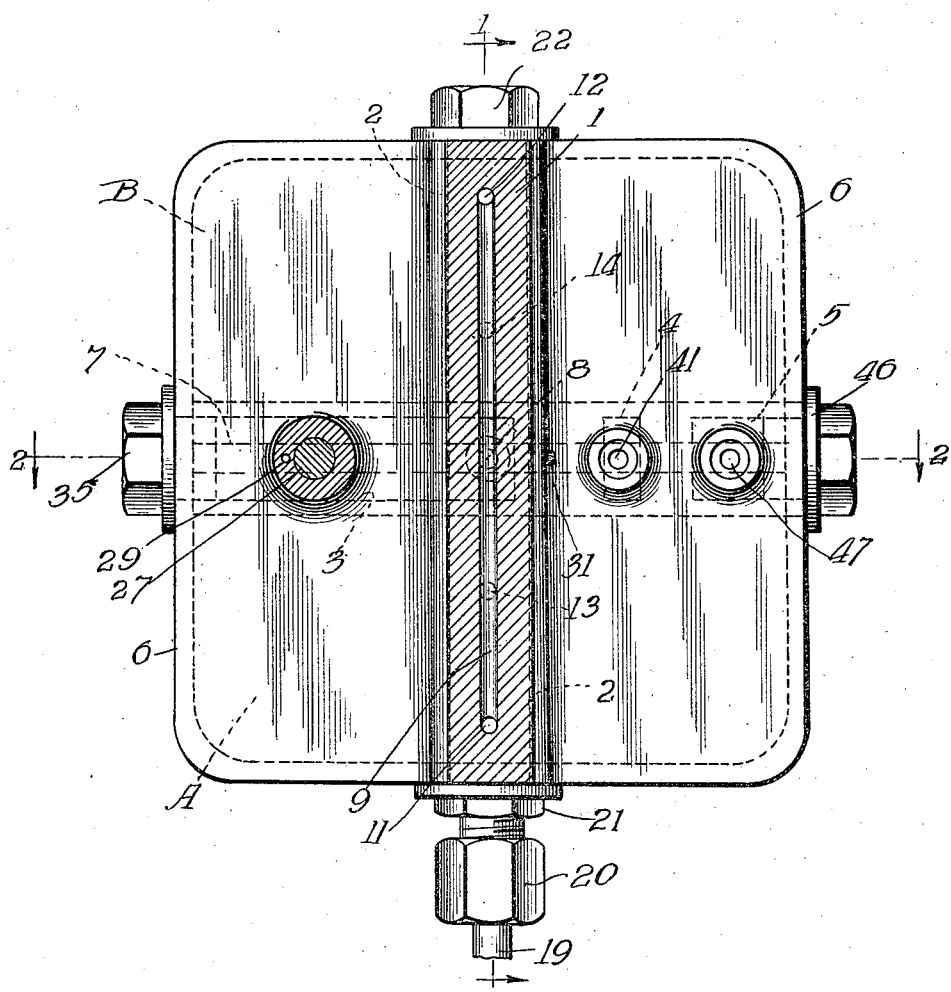

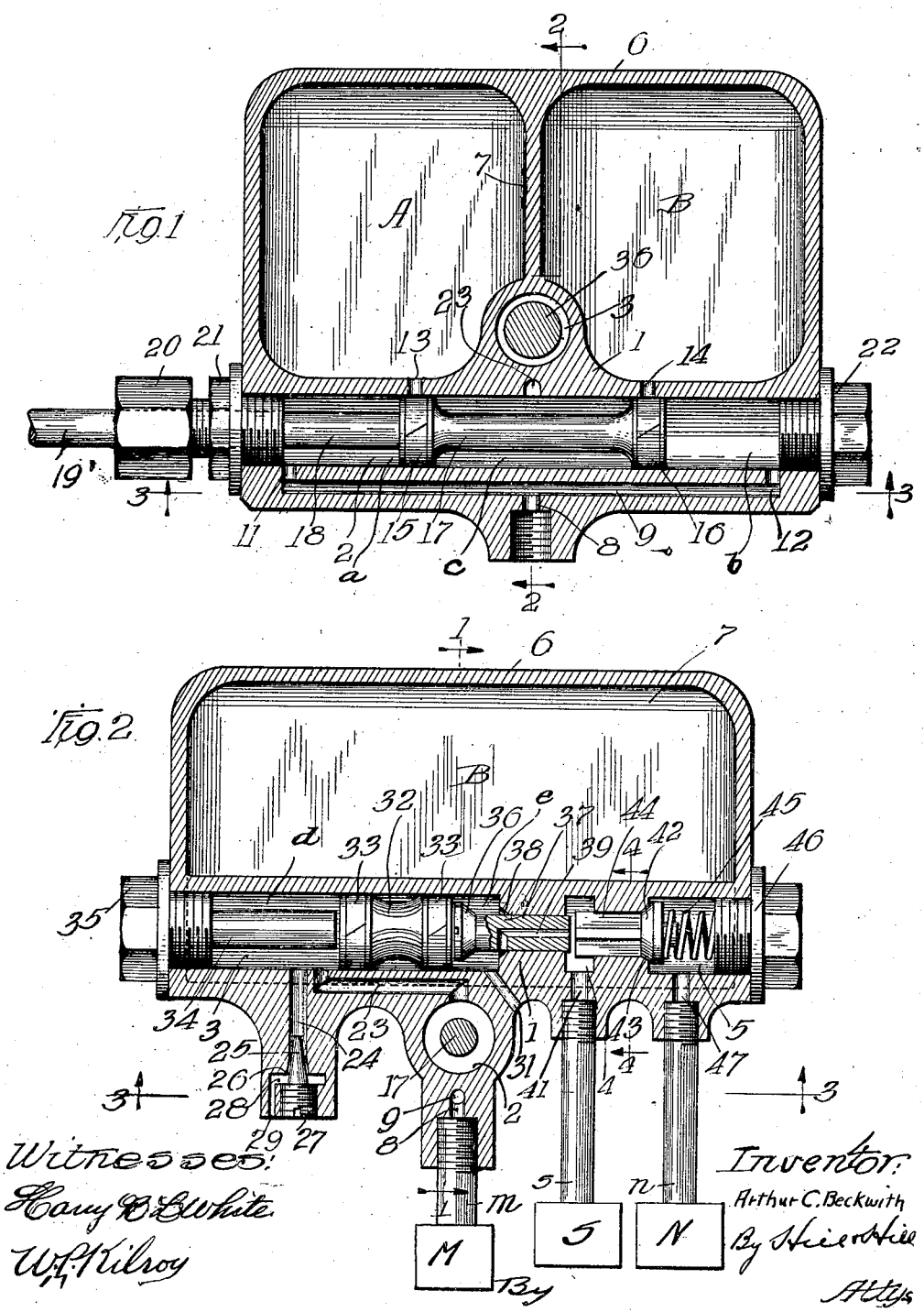

Patented Sept. 11, 1923.

1,467,417

UNITED STATES PATENT OFFICE.

ARTHUR C. BECKWITH, OF CHICAGO, ILLINOIS, ASSIGNOR TO CHICAGO LUBRICATOR COMPANY, OF CHICAGO, ILLINOIS, A CORPORATION OF ILLINOIS.

AUTOMATIC FLUID-PRESSURE-CONTROLLING DEVICE.

Application filed June 13, 1918. Serial No. 239,808.

*To all whom it may concern:*

Be it known that I, ARTHUR C. BECKWITH, a citizen of the United States, residing at Chicago, in the county of Cook and State of Illinois, have invented certain new and useful Improvements in Automatic Fluid-Pressure-Controlling Devices, of which the following is a description.

My invention belongs to that general class of devices known as fluid pressure controlling devices, and relates particularly to a device that may be used conjointly with other apparatus so as to automatically control the same by controlling the supplying and exhausting of the fluid pressure to and from desired apparatus. The device might be called an automatically controlled transfer valve arranged to permit or control the supplying and exhausting of a suitable fluid to and from a desired apparatus or apparatuses so as to control said apparatus in a predetermined manner. The invention has among its objects the production of a device of the kind described that is simple, convenient, durable, compact, efficient, dependable and satisfactory for use wherever found applicable. More particularly it has as an object the production of a device which may be applied to machinery of various kinds, as for example an engine, for controlling various kinds of associated apparatus while the engine is running and automatically controlling the same when the engine is stopped. Many other objects, advantages and uses of the device herein shown and described will be obvious to those skilled in the art from the disclosures herein given.

To this end, my invention consists in the novel construction, arrangement and combination of parts herein shown and described and more particularly pointed out in the claims.

In the drawings, wherein like reference characters indicate like or corresponding parts, Fig. 1 is a sectional view taken substantially on line 1—1 of Fig. 2 or Fig. 3, illustrating one form of my device;

Fig. 2 is a sectional view taken substantially on line 2—2 of Fig. 1 or Fig. 3;

Fig. 3 is a sectional view taken substantially on line 3—3 of Fig. 1 or Fig. 2; and Fig. 4 is a sectional view taken substantially on line 4—4 of Fig. 2.

Referring to the drawings, 1 represents a chambered part, it being understood that the part 1 is made or constructed in such manner as to be most economical both in the manufacture as well as in the assembling of the various parts hereinafter specified. The part 1, it may be mentioned, is provided with chambers 2, 3, 4 and 5, and I have shown the same extended as at 6 (Fig. 3) and provided with a partition 7 so as to provide chambers A and B, which are constructed to communicate with the chamber 2 as will be hereafter referred to.

The part 1 is provided with an inlet 8 which communicates with the passage 9 formed with ports 11 and 12 opening into the chamber 2. (Fig. 1.) Chamber 2 communicates with the chambers A and B through the ports 13 and 14, and with chamber 3 through port or duct 23, the communication, however, being controlled by a valve 17. Valve 17 is preferably provided with piston rings 15 and 16, or the equivalent, so that the same may be termed a plunger or piston valve. Obviously, however, any equivalent form of valve might be employed. The valve 17 is actuated and controlled in any suitable manner, this depending on the installation of the device. As shown, the same is provided with an actuating stem 18, which may be extended or provided with an extending rod 19 which is preferably secured to some source of power, which will transmit a reciprocating movement to the rod. A suitable stuffing box, represented by 20, may be arranged to prevent leakage where the rod extends into the chamber 2. I have shown the end walls of the chamber 2 formed by the plugs 21 and 22, it being understood that any equivalent construction may be employed. Inasmuch as my device is particularly adapted and suitable for use on steam engines, I shall describe its installation in that connection, but do not of course consider that its use is so limited. When the same is used in a steam engine I preferably connect rod 19 to some part of the engine which will transmit a reciprocating movement to the piston or plunger 17, so that when the engine is running (in either direction) the valve will be reciprocated back and forth in its chamber 2. For convenience the rod in such an installation may be connected with the main valve stem of the engine. In locomotive service, however, the main valve travel is not uniformly even at all times, due to cutting off the supply of steam to the cylinder early in the piston stroke. When desired to use the steam expansively, this means that the main valve in short cut off may only travel a little more than its lap and lead, say for illustration 2½ inches, while in full gear it will travel several inches, and at other times will travel any distance between full gear and short cut off. Therefore, in order to connect the rod 19 with the engine main valve stem, the ports 13 and 14, as well as the port 23 hereafter referred to, will have to be located to provide for the longest main valve travel. I prefer to make the valve 17 so that it will lap ports 13 and 14 in its central position as shown, and in this position, and the engine main valve in its central position, 19 will be connected to the main valve stem so that any movement made by the engine main valve in either direction from its central position will be made by the valve 17. From this it will be seen that a long or short main valve travel will not affect or vary the operation of the valve 17.

Arranged preferably between the ports 13 and 14 is the port 23, which is extended to form a passage to the chamber 3. For clearness in description I shall designate the variable space in chamber 2 between the one end 15 of the valve and the end of the chamber 2 as space $a$, and the opposite variable portion of the chamber between the valve and end of the chamber 2 as space $b$, and the space in the chamber between the rings 15 and 16 as space $c$.

Chamber 3 is provided with a discharge port 24, the discharge of fluid through the port being controlled by a valve 25 or its equivalent. I have shown the casing of part 1 provided with a valve seat 26, the valve being formed with a stem part 27 so that the valve may be controlled as desired. A passage 28 having an outlet 29 is shown adjacent the valve so as to provide a leakage port when the valve is open to the desired extent. An outlet port 31 is also provided for the chamber 3, this being adjacent the opposite end of the chamber. Arranged within chamber 3 is a plunger or piston 32 preferably provided with rings 33 so as to prevent leakage past the piston. For clearness I have designated the spaces at each side of the piston or plunger 32 with the characters $d$ and $e$. A stop pin 34 is provided to limit the movement of the piston 32, and this pin is preferably adjustably carried by the part 35, which forms a closure for one end of chamber 3. Chambers 3 and 4 are connected by a passage, through which extends what may be termed an exhaust valve 36, 37 being the stem thereof. A valve seat 38 is provided arranged to receive the valve 36 and the stem is formed with a duct or passage 39, through which communication may be had between chamber 4 and space $e$ of chamber 3. The passage, however, is so formed that upon movement of the valve to its closed position, communication between the space and chamber referred to is prevented. Chamber 4 is provided with a port 41 (there may be any desired number), and the chamber is arranged to communicate with chamber 5. A valve 42, however, is arranged to control communication between the chambers 4 and 5. As shown, the valve is provided with the stem 44 arranged to guide the valve in its movement and permit the passage of fluid from chamber 5 to chamber 4 when the valve is open. A spring 45 tends to move valve 42 to its closed position, the spring being arranged between the valve and the closure part 46. Chamber 5 communicates with a port 47.

Before describing the operation of the device it may be explained that a suitable source of fluid supply under pressure is connected with the port 8. This may be air, oil, water or other fluid under or at a pressure. I have shown a receptacle M connected by pipe $m$ connected with the intake 8, and for purposes of description it may be assumed that M is a device for supplying, or a source of, compressed air. Port 47 is connected to a source of fluid under pressure which may be compressed air, oil, water, steam or the like. I have shown N as a source of such fluid, which is connected by pipe $n$. It may be mentioned that if M and N are the same fluid and of the same pressure, then M and N may be a common source. Port 41 is connected through suitable piping to the apparatus or several apparatuses to be controlled by my device, it being understood that this device to be controlled may in itself serve to control other apparatus. For the purpose of description I have indicated such apparatus by S, the same being connected to port 41 by pipe $s$. S may represent a control for hydrostatic or other lubricator, or a control for valves, electric switches and various other apparatus suitably constructed or arranged to be controlled by a suitable fluid by supplying fluid to or withdrawing the same from the apparatus as the case may be. In some instances N might be apparatus controlled by the escape of its fluid under pressure.

With the preceding in mind, the operation of my device may be described as follows. Fluid pressure being turned on, the same flows from M through $m$, through 8, 9, 11 and 12 into the spaces $a$ and $b$. Fluid pressure also flows from N through $n$, 47 into chamber 5 and to the valve 42. When the engine moves valve 17 will move with the main valve of the engine, for illustration we will say to the right, opening port 13 (see Fig. 1), and fluid pressure from space

*a* passing through port 13 will charge chamber A. Space *c* of the valve 17 this time connects chamber B with space *d* through port 14. As the reciprocation continues and takes place in the reverse direction, valve 17 moves to the left, opening port 14, so that fluid pressure in space *b* will charge B through port 14. However, this time space *c* will connect chamber A and space *d* of chamber 3 through port 13, space *c* and port 23. The fluid pressure in A or B will equalize with *d*, forcing piston 32 to move to the right, closing exhaust valve 36 and opening valve 42 against fluid pressure in chamber 5 and the tension of the spring 45, allowing fluid from the supply N to flow through 47 and chamber 5, past valve 42, and out through 41 into S. The return of valve 17 to the right again connects chamber B and space *d* and so on while the engine is running, chambers A and B being alternately connected with space *d*, thus maintaining pressure in space *d* so as to maintain valve 42 open and valve 36 closed. The timing valve 25 is adjusted or set to relieve pressure in space *d* and either chamber A or B as soon after the engine stops as may be desired, so that the piston 32 will return to the position shown, being moved back by the pressure in chamber 5 and chamber 4, as well as spring 45. Thus valve 42 is allowed to close and exhaust valve 36 to open. Opening valve 36 permits the fluid pressure in S to exhaust through 41, through port 39 in valve stem 37, and through port 31 to the atmosphere or where desired. It will be noted that port 39 of valve 36 is closed first by the contact of the stem 37 of the valve 36 with the end of the stem of the valve 42. This occurs before valve 42 is opened. Also the stem is a piston fit, and port 39 has its delivery through the side of the stem, so that when the piston 32 returns to the position shown and valve 36 is unseated, the exhaust will not take place until after valve 42 is seated. After valve 42 closes, the pressure in chamber 4, acting on the stem end of valve 36, will cause it to separate from the valve 42, opening port 39 wide, thus permitting a quick exhaust through 41, chamber 4, 39, *e* and 31.

It will thus be seen that my device is arranged to control or permit the supplying and exhausting of a fluid to and from the desired apparatus. The device in itself does not manufacture or produce fluid pressure, but it does release or control the transfer of fluid from one or several devices to another or several for the control or operation of, or for causing to operate said apparatus or devices automatically, or to transmit fluid pressure for any other purpose desired, as well as to shut off a supply of fluid and permitting its exhausting from the apparatus when the engine or other source of power is stopped. It is thus possible and practical to cause certain apparatus, associated with or remote from the engine, to operate while the engine is running and to stop when the engine is stopped, or vice versa to cause certain apparatus to be stopped while the engine is running and to allow it to operate while the engine is stopped, this of course depending upon the particular controlling apparatus, or apparatus controlled in connection therewith. As before mentioned the device may transfer the same kind of fluid pressure used in its own operation or control, or it may use one kind of fluid pressure in its control or operation and transfer or control another kind. Generally I prefer to operate the device with compressed air, and to use compressed air as the fluid pressure transferred for the control of other apparatus, but the device will operate on compressed air and transfer steam or other fluid under pressure. On locomotive apparatus compressed air as a motive power for various operating or controlling apparatus is almost always available.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:—

1. In a device of the kind described and in combination, a chambered part provided with a fluid inlet and a fluid outlet, means independent of said inlet and outlet for admitting or discharging fluid from the chamber in said part, a valve for said inlet, a valve for said outlet, and means for controlling said valves whereby fluid is admitted through said inlet and transferred through said chamber and thence discharged through said independent means, comprising fluid pressure controlled means independent of said valves and controlling the movement thereof, and mechanically actuated means for controlling the pressure controlling said pressure controlled means.

2. In a device of the kind described and in combination, a suitable casing provided with a transfer chamber having an inlet, an outlet, and a port independent of said inlet and outlet for the admission to and discharge of fluid from said chamber, a valve arranged at said inlet, a valve independent of said first-mentioned valve and arranged at said outlet, said casing provided with an associated chamber, a floating plunger in said last-mentioned chamber independent of said valves and arranged to maintain said outlet valve in its closed position and substantially simultaneously open the inlet valve, means for controlling the admission of a fluid under pressure to said controlled chamber whereby said plunger will normally maintain said outlet valve in its closed position, means for relieving the pressure in said associated chamber, and means automatically operable to retrieve said last-mentioned valve and plunger to their normal position when the pressure is relieved in said last mentioned chamber.

3. In a device of the kind described and in combination, a casing provided with a plurality of communicating chambers, a fluid outlet between the first and second chamber, said first chamber provided with a fluid inlet, a third chamber communicating with said second chamber, and a fourth chamber communicating with said third chamber, a valve arranged to control the passage of fluid between said second and third chambers, a valve arranged to control the passage of fluid between said third and fourth chambers, said first-mentioned valve arranged to actuate said last-mentioned valve, movable means in said second chamber for actuating said first-mentioned valve, and means for controlling the movement of said last-mentioned means.

4. In a device of the kind described and in combination, a casing provided with a plurality of communicating chambers, the first chamber provided with a fluid inlet and with a fluid outlet communicating with the second chamber, a third chamber communicating with the second chamber and a fourth chamber communicating with the third chamber, a valve arranged to control the passage of fluid between the second and third chambers, a valve arranged to control the passage of fluid between the fourth and third chambers, said valve for controlling the passage of fluid between the second and third chambers arranged to actuate said last mentioned valve, ports for said third and fourth chambers and piping extending from said ports, and a plunger arranged between the inlet and outlet of said second chamber for actuating the valve between the second and third chambers, and means for controlling and timing the movements of said plunger whereby the passage of fluid through said third chamber may be controlled in a predetermined manner.

5. A device of the kind described comprising a casing having two chambers therein and provided with an inlet and an outlet communicating with said chambers, mechanism for controlling the admission and discharge of fluid to and from one chamber, mechanism for controlling the admission to and discharge of fluid from the other chamber, and means for actuating said controlling means whereby fluid is alternately admitted and discharged from said chambers, a substantially constant pressure normally maintained in the chambers, and cooperating mechanism operable by the fluid discharged through said outlet.

6. A device of the kind described comprising a casing having two chambers therein and provided with an inlet and an outlet communicating with said chambers, means for controlling the admission and discharge of fluid to and from said chambers, and means for positively actuating said controlling means in a predetermined manner to alternately admit and discharge fluid to and from said chambers to normally maintain a substantially constant pressure therein.

In testimony whereof, I have hereunto signed my name in the presence of two subscribing witnesses.

ARTHUR C. BECKWITH.

Witnesses:
 Roy W. Hill,
 Charles I. Cobb.